US012630012B2

(12) United States Patent (10) Patent No.: US 12,630,012 B2
Yu et al. (45) Date of Patent: *May 19, 2026

(54) ELECTRONIC SHIFT CONTROL APPARATUS AND METHOD FOR CONTROLLING THE SAME

(71) Applicants: Hyundai Motor Company, Seoul (KR); Kia Corporation, Seoul (KR)

(72) Inventors: Jae Yeon Yu, Hwaseong-Si (KR); Yeong Jik Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/740,837

(22) Filed: Jun. 12, 2024

(65) Prior Publication Data

US 2025/0242691 A1     Jul. 31, 2025

(30) Foreign Application Priority Data

Jan. 29, 2024     (KR) ........................ 10-2024-0013421

(51) Int. Cl.
    *B60K 20/06* (2006.01)
(52) U.S. Cl.
    CPC ................................... *B60K 20/06* (2013.01)
(58) Field of Classification Search
    CPC ..................................................... B60K 20/06
    USPC ....................................................... 74/473.31
    See application file for complete search history.

(56) References Cited

U.S. PATENT DOCUMENTS

| | | | |
|---|---|---|---|
| 3,811,020 | A | 5/1974 | Johnson et al. |
| 3,969,951 | A | 7/1976 | Blackwood |
| 5,775,165 | A | 7/1998 | Lu |
| 12,209,656 | B2 | 1/2025 | Kim et al. |
| 2018/0259062 | A1 | 9/2018 | Wang |
| 2018/0283543 | A1* | 10/2018 | Cha ........................ F16H 61/24 |
| 2020/0003300 | A1 | 1/2020 | Yang |
| 2021/0172512 | A1 | 6/2021 | Soave et al. |
| 2022/0154816 | A1 | 5/2022 | Song et al. |
| 2024/0271697 | A1 | 8/2024 | Kim |

FOREIGN PATENT DOCUMENTS

| | | |
|---|---|---|
| KR | 10-0656936 B1 | 12/2006 |
| KR | 10-2022-0065468 A | 6/2022 |
| KR | 10-2024-0126221 A | 8/2024 |

OTHER PUBLICATIONS

Non-Final Office Action dated Mar. 26, 2025, U.S. Appl. No. 18/678,242.

* cited by examiner

*Primary Examiner* — T. Scott Fix
(74) *Attorney, Agent, or Firm* — MORGAN, LEWIS & BOCKIUS LLP

(57) ABSTRACT

In a column-type electronic shift control apparatus of which position may be varied not only by driving a driving unit but also by a predetermined amount of external force, and which may prevent unintentional shifting when the position is changed by the predetermined amount of external force, and a method for controlling the same, the shift control apparatus includes a housing; a column module including a module body rotatably coupled to the housing, and a shift lever rotatably hinged relative to the module body and protruding from the housing; and a driving unit provided in the housing and engaged to the module body to rotate the module body.

13 Claims, 10 Drawing Sheets

ELECTRONIC SHIFT CONTROL APPARATUS AND METHOD FOR CONTROLLING THE SAME

CROSS-REFERENCE TO RELATED APPLICATION(S)

The present application claims priority to Korean Patent Application No. 10-2024-0013421 filed on Jan. 29, 2024, the entire contents of which is incorporated herein for all purposes by this reference.

BACKGROUND OF THE PRESENT DISCLOSURE

Field of the Present Disclosure

The present disclosure relates to a column-type electronic shift control apparatus of which a position may be varied not only by driving a driving unit but also by a predetermined amount of external force, and which may prevent unintentional shifting when the position is changed by the predetermined amount of external force, and a method for controlling the same.

Description of Related Art

In general, among transmission devices provided in vehicles, a shift-by-wire transmission device may be an electronic transmission device configured to control transmission by receiving an electrical signal according to a shift control of a driver. The present shift-by-wire transmission device may have a structure in which a shift lever operates, like a switch, to electrically send a signal and operates the transmission by a driving device such as a solenoid, a motor, or the like.

In the present manner, there may be an advantage that the electronic transmission device, based on shift-by-wire, transfers transmission intention of the driver as an electric signal to a transmission control unit by simple operation, and the transmission control unit controls the driving device, making the shift control to a D (forward driving) stage, an R (reverse driving) stage, an N (neutral) stage, or the like more easily. Furthermore, the transmission device may be miniaturized, allowing a wide space to be secured between a seat for the driver and a seat for a front passenger.

On the other hand, when an abnormal external force is applied to the shift lever, shifting may be easily performed, or in severe cases, a component such as a shift lever, a gear member, a driving unit, or the like, making up the transmission device, may be damaged. For example, in the event of a malfunction, the driver may be forced to operate the shift lever. When a direction of the forced operation matches a direction of shifting to a D stage, there may be a risk of unintentional shifting to the D stage.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a column-type electronic shift control apparatus of which position may be varied not only by driving a driving unit but also by a predetermined amount of external force, and which may prevent unintentional shifting when the position is changed by the predetermined amount of external force, and a method for controlling the same.

According to an aspect of the present disclosure, a shift control apparatus includes a housing; a column module including a module body rotatably coupled to the housing, and a shift lever rotatably hinged relative to the module body and protruding from the housing; and a driving unit provided in the housing and engaged to the module body to rotate the module body.

A sector gear may be formed on one side of the module body and engaged with a gear unit of the driving unit, and an expansion portion extending in a radial direction and including a hollow portion may be formed on the other side of the module body, and one end portion of the shift lever may be accommodated in and hinged to the expansion portion.

The shift lever may include a support bar extending in a predetermined direction, intersecting a longitudinal axis line of the shift lever, and the column module may further include a support block provided on the module body to support movement of the support bar.

A bullet rod and a spring may be mounted in the support bar, and an end portion of the bullet rod may protrude out of the support bar by elastic force of the spring.

A guide groove into which the end portion of the bullet rod is movably inserted may be formed on one side surface of the support block, and a depth of the guide groove may be deepest in a center portion in a longitudinal direction and may gradually decrease toward an end thereof.

A first sensor detecting rotation of the column module may be disposed in the housing, a second sensor detecting rotation of the shift lever may be disposed in the expansion portion, and the first sensor and the second sensor may be physically or electrically connected to a printed circuit board mounted in the housing.

The driving unit may include a motor fixed in the housing; the gear unit transmitting driving force of the motor to the sector gear; and a shaft rotating and supporting at least a portion of the gear unit, wherein a printed circuit board may be mounted in the housing to control driving of the motor.

The gear unit may include a worm mounted on a motor axis of the motor; a worm wheel including an annular shape and engaged with the worm; an intermediate gear fixedly mounted on the shaft and disposed coaxially with the worm wheel; and an override unit connecting the worm wheel and the intermediate gear, wherein the intermediate gear may engage with the sector gear, and the override unit may allow the intermediate gear to rotate relative to the worm wheel when external force is applied.

The override unit may include a first override gear unit formed on an end portion of an internal surface of the worm wheel; a plurality of spline groove portions formed on an internal surface of a side wall in an accommodation groove of the intermediate gear; an override ring member in which a second override gear unit engaged with the first override gear unit is formed on one side, and a plurality of spline protrusions at least partially fitted into each of the spline groove portions are formed on the other side; and an elastic member located between the accommodation groove and the override ring member.

The first override gear unit may include a plurality of first groove portions, wherein first and second side walls of each of the first groove portions include a first inclined surface, the second override gear unit may include a plurality of second protrusions to correspond to the first override gear units, wherein both side surfaces of each of the second protrusions in a circumferential direction may include a second inclined surface, and when external force is applied, the second protrusion may be inserted into another adjacent first groove portion over one of first inclined surfaces of the first groove portion, so that the override ring member in the intermediate gear may rotate with respect to the worm wheel.

The housing may be fixed on a steering column in front of a steering wheel, wherein the steering column may pass through the housing and the module body together, the column module may rotate around the steering column when the driver operates, and may change a position thereof to a standby mode or a use mode.

The standby mode may be a position in which the column module extends from the front portion of the steering wheel in an upward direction, and the use mode may be a position in which the column module rotates from the standby mode and is located to extend in a lateral direction of the steering wheel.

A rotational trajectory of the column module may coincide with a rotational trajectory of the shift lever.

According to an aspect of the present disclosure, a method of controlling a shift control apparatus, includes, when a column module is in a standby mode, operating a driving unit and determining whether the driving unit is operating; when the driver operates, determining whether the column module is rotating; when operations of the driving unit and the column module stop, determining whether the column module is in a use mode; when the column module is in the use mode, determining that a gear stage is in a changeable state; determining whether a position of the shift lever has changed; and when the position of the shift lever changes, transmitting a shift signal according to the position of the shift lever.

The determining of whether the driver is operating and the determining of whether the column module is rotating may include using a first sensor detecting rotation of the column module, and the determining of whether a position of the shift lever has changed may include using a second sensor detecting rotation of the shift lever.

The method may further include, when the driver is not operating or when the column module stops and is not in the use mode, controlling to guide an override function.

The method may further include, after the guiding an override function, determining whether the column module is in the use mode; and determining whether the shift lever has returned to an initial position thereof.

The method may further include, when it is determined that the column module is in the use mode and the shift lever has returned to the initial position thereof, determining that a gear stage is in a changeable state; determining whether a position of the shift lever has changed; and when the position of the shift lever changes, transmitting a shift signal according to the position of the shift lever.

The method may further include, before the transmitting a shift signal, maintaining an actual gear stage of a vehicle in an N-stage or a P-stage.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
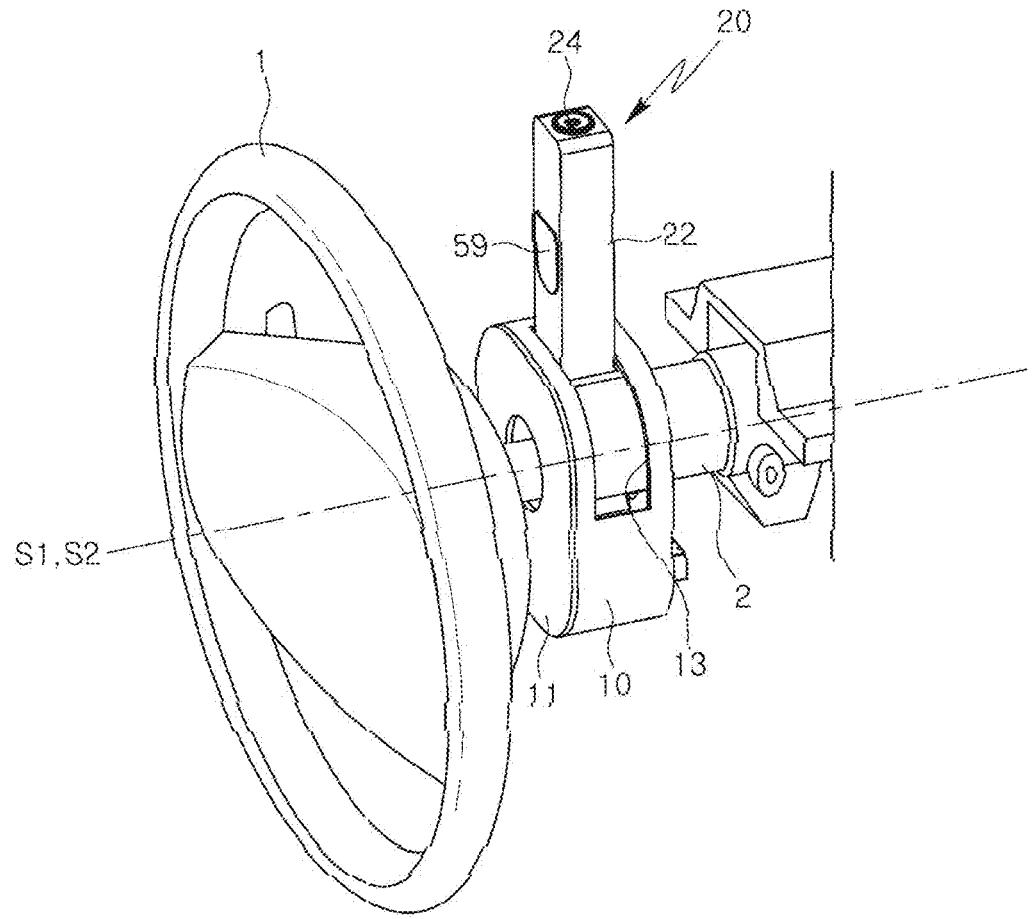
FIG. 1 is a view exemplarily illustrating an example in which a shift control apparatus according to an exemplary embodiment of the present disclosure is provided.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail through example drawings. When adding reference numerals to components in each of the drawings, it should be noted that identical components are provided the same reference numerals as much as possible even if they are illustrated in different drawings.

In the present specification, a vehicle refers to a variety of vehicles that move a transportable object, such as people, animals, goods, or the like, from a starting point to a destination. These vehicles are not limited to vehicles that run on roads or tracks.

In the present specification, terms such as first, second, or the like may be used to describe various components, but a sequence, sizes, locations, and degrees of importance of these components are not limited by terms such as first, second, or the like, and may be named only for distinguishing one component from other components.

Figure 2:
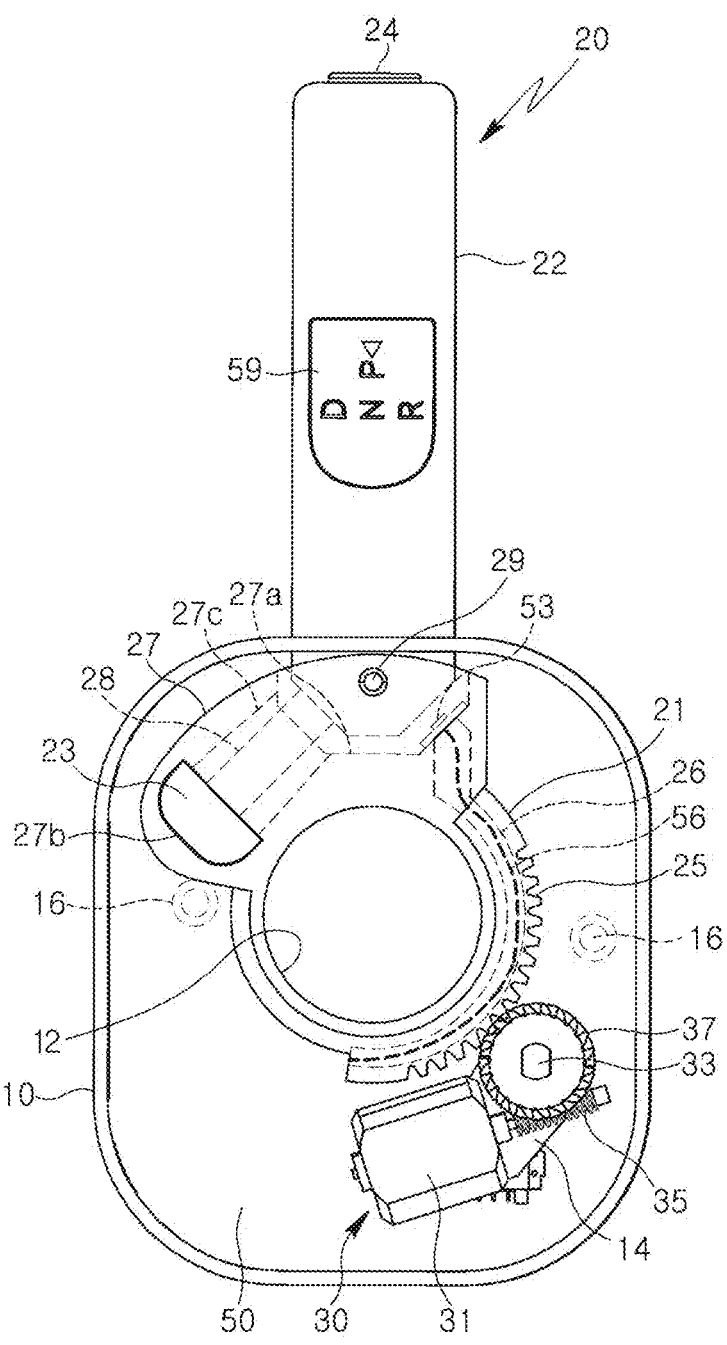
FIG. 2 is a front view exemplarily illustrating a shift control apparatus according to an exemplary embodiment of the present disclosure with a cover removed.
Figure 3:
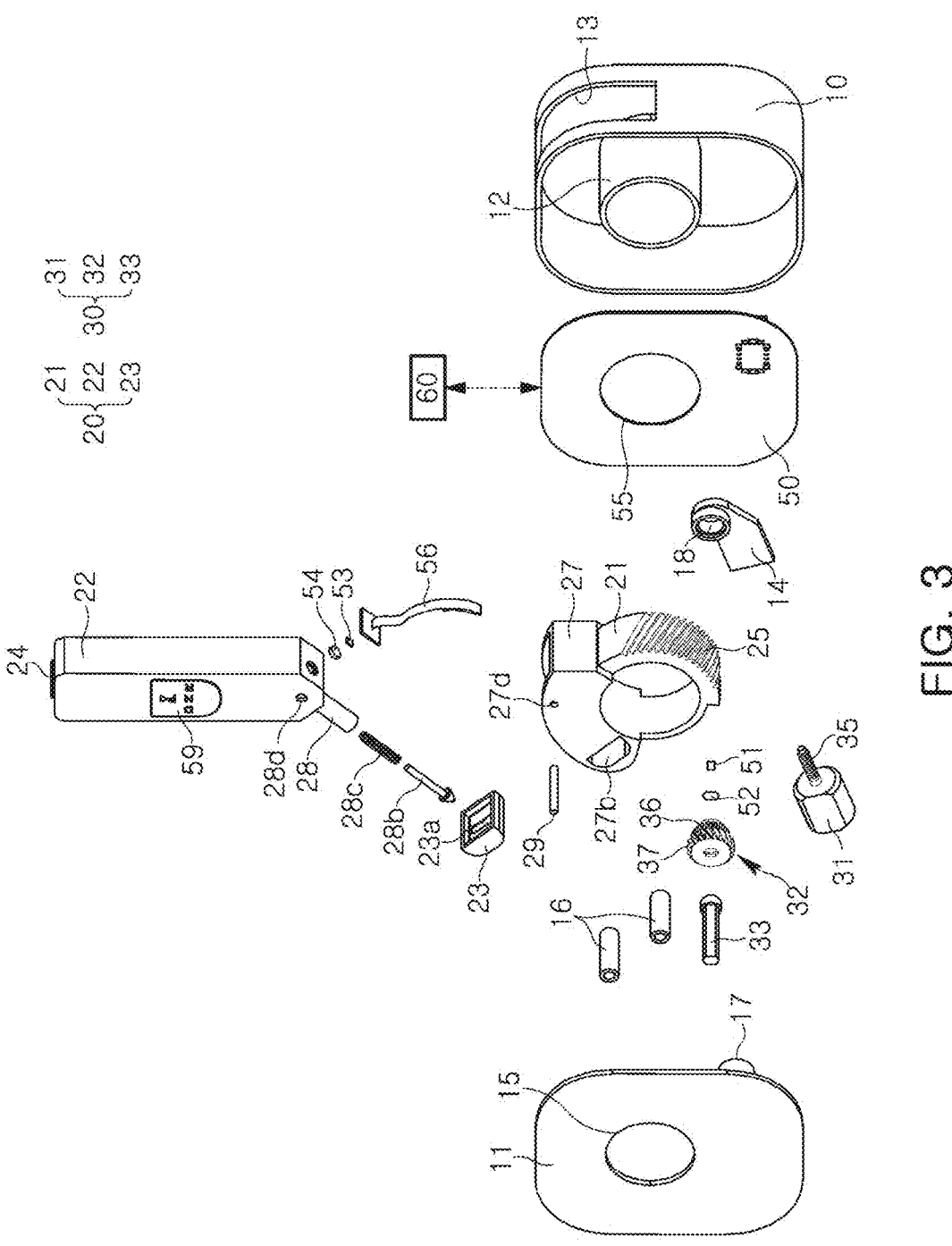
FIG. 3 is an exploded perspective view of a shift control apparatus according to an exemplary embodiment of the present disclosure.

FIG. 1 is a view exemplarily illustrating an example in which a shift control apparatus according to an exemplary embodiment of the present disclosure is provided, and FIG. 2 is a front view exemplarily illustrating a shift control apparatus according to an exemplary embodiment of the present disclosure with a cover removed. FIG. 3 is an exploded perspective view of a shift control apparatus according to an exemplary embodiment of the present disclosure.

A shift control apparatus according to an exemplary embodiment of the present disclosure may include a housing 10, a column module 20, and a driving unit 30.

As illustrated in FIG. 1, a shift control apparatus according to an exemplary embodiment of the present disclosure may be provided on a steering wheel 1 of a vehicle so that the driver may control shift of a gear stage through the column module 20. This may have an advantage of not having to provide a separate space for arrangement of the shift control apparatus and the column module.

A rotation axis S1 of the column module 20 and a rotation axis S2 of the steering wheel 1, forming the shift control apparatus, may be arranged substantially concentrically.

A steering column 2 of the vehicle may pass through the housing 10 and a portion of the column module 20, and the housing may be fixed on the steering column 2 in a front of the steering wheel 1. Therefore, the column module may rotate around the steering column.

In the present manner, when the steering column 2 passes through the portion of the column module 20 and the column module is provided to be rotatable with respect to the steering column, the rotation axis S1 of the column module and the rotation axis S2 of the steering wheel 1 may be substantially coaxial with the steering column 2. In the instant case, layouts of the shift control apparatus and the column module may be reduced.

The arrangement of the shift control apparatus is not necessarily limited to the example illustrated above, and for example, the steering column 2 may not pass through the column module 20, and the housing 10 may be located outside of the steering column.

For example, the rotation axis S1 of the column module 20 and the rotation axis S2 of the steering wheel 1 may be spaced from each other and arranged in parallel. In the instant case, since the shift control apparatus and the column module may be provided in various positions as needed, there may be an advantage in that a degree of design freedom is improved.

The housing 10 may be a member including a box shape or a shape of cylinder, may include an accommodation space formed therein, and may include a cover 11 covering the accommodation space.

A shaft member 12 including a shape of a tube may be provided in the housing 10, and a module body 21 of the column module 20 may be fitted onto an external peripheral surface of the shaft member so that the column module may be rotatably coupled to an internal portion of the housing. For example, the shaft member may form the rotation axis S1 of the column module.

Additionally, in the housing 10, a long hole 13 extending in a direction, surrounding the shaft member, may be formed in a side wall extending in a direction, parallel to the shaft member 12. The column module 20 may be coupled to the shaft member while passing through the long hole and being inserted into the housing so that rotation thereof may be guided by the long hole, and a position thereof may be varied. As a result, the column module may be disposed to protrude from the shaft member of the housing in a radial direction of the shaft member.

The driving unit 30 may be provided and accommodated in the accommodation space in the housing 10. Additionally, a support member 14 for installing and supporting a motor forming the driving unit 30 may be provided in the accommodation space in the housing 10.

Additionally, a printed circuit board (hereinafter, referred to as a PCB) 50 may be built into the accommodation space in the housing 10. The PCB may form a controller that is configured to control the shift control apparatus or at least an operation of the driving unit 30.

An IC chip, a first sensor 51, and the like may be mounted on the PCB 50. The PCB may use a signal from the first sensor to detect rotation of the column module 20 and control driving of the driving unit 30. Additionally, the PCB may be provided with a communication module and may communicate with a high rank control system and/or a transmission control unit in the vehicle via wired communications, wireless communications, or wired/wireless communications.

The PCB 50 may detect a position of the column module 20 by the first sensor 51, and thereby, it is possible to know whether the column module is properly located in a standby mode or a use mode.

Additionally, the PCB 50 may be configured for controlling driving of the driving unit 30 using the signal from the first sensor 51, and may further control rotation of the column module 20. Because of this, the column module may rotate from the standby mode to the use mode, or from the use mode to the standby mode, changing a position thereof.

The housing 10 may be fixedly coupled to the steering column 2, for example, as described above. An internal portion of the shaft member 12 in the housing may communicate with an external portion outside the housing, and the cover 11 and the PCB 50 may include a through-hole 15 and a through-hole 55, formed at positions corresponding to the shaft member, respectively.

As a result, the steering column 2 may pass through the housing 10, the shaft member 12, the PCB 50, the module body 21 of the column module 20, the cover 11, and the like. The housing may be fixed to the steering column, for example by bolting or the like, with the steering column passing therethrough.

The cover 11 may be a member including a plate shape, and a plurality of stoppers 16 limiting rotation of the column module 20 around the through-hole 15 may be provided on an internal side surface facing the accommodation space of the housing 10. Additionally, a support hole 17 formed to support an end portion of a shaft 33 forming the driving unit 30 may be provided in the cover.

Figure 4:
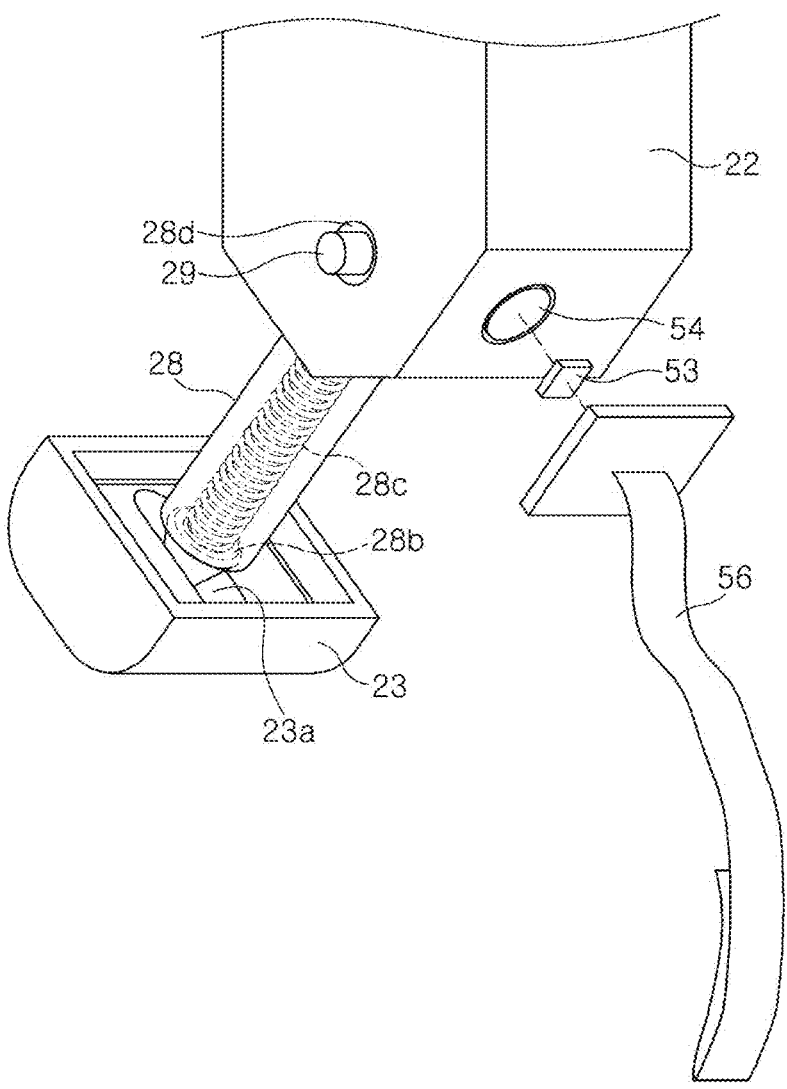
FIG. 4 is a partially enlarged perspective view exemplarily illustrating a column module of the shift control apparatus according to an exemplary embodiment of the present disclosure, illustrated in FIG. 3.

FIG. 4 is a partially enlarged perspective view exemplarily illustrating a column module of the shift control apparatus according to an exemplary embodiment of the present disclosure, illustrated in FIG. 3. As illustrated, the column module 20 may include a module body 21, a shift lever 22, and a support block 23.

The module body 21 may be a member including an annular shape, which may be fitted and rotatably coupled to the shaft member 12 including a shape of a tube in the housing 10, allowing the column module 20 to rotate inside and outside the housing.

A sector gear 25 including a plurality of teeth may be formed on one side of an external peripheral surface of the module body 21. As the sector gear engages with a gear unit 32 forming the driving unit 30, the column module 20 may rotate according to rotation of the gear unit.

A wiring passage 26 may be formed between the sector gear 25 and an internal peripheral surface of the module body 21, e.g., inside the module body, for a predetermined arc length in a circumferential direction of the module body.

An expansion portion 27 extending in a radial direction and including a hollow portion may be formed on the other side of the external peripheral surface of the module body 21. The hollow portion may be exposed radially outward to define a mounting groove 27a on one side of the expansion portion, and a through-hole 27b passing through in an axial direction of the module body including an annular shape may be formed on the other side of the expansion portion. A connection channel 27c may be formed between the mounting groove and the through-hole so that the mounting groove and the through-hole may communicate. Additionally, the mounting groove and the wiring passage 26 may be in communication.

Among side walls of the mounting groove 27a, a first hinge hole 27d may be formed on a pair of side walls spaced apart in the axial direction of the module body, to be hinged to one end portion of the shift lever 22 via a hinge pin 29.

The shift lever 22 may be a member including a column shape member and a hollow portion, and may include a second hinge hole 28d formed in one end portion, and a support bar 28 extending in a direction, intersecting a longitudinal axis line of the shift lever at one side of the one end portion.

The one end portion of the shift lever 22 may be inserted into the mounting groove 27a defined in the expansion portion 27 of the module body 21. The one end portion of the shift lever may be spaced from an internal surface of the mounting groove by a predetermined gap, and may move within the mounting groove.

The second hinge hole 28d of the shift lever 22 may be aligned with the first hinge hole 27d of the module body 21, and may be connected to the first hinge hole via the hinge pin 29 so that the shift lever may be provided to rotate in the mounting groove 27a around the hinge pin.

In the present manner, the one end portion of the shift lever 22 may be accommodated in the expansion portion 27 of the module body 21, and may be hinged to the module body and the expansion portion, and thus the shift lever may rotate relative to the module body.

The support bar 28 may be a member including a shape of a tube, and one side of which may be fixedly mounted on an external surface of the shift lever 22, and an exposed hole having a diameter, smaller than an internal diameter, may be formed on the other side thereof. The support bar 28 may include a bullet rod 28b and a spring 28c, built thereinto, to form a so-called spring plunger.

A cone-shaped portion may be formed in an end portion of the bullet rod 28b, but is not necessarily limited thereto, and for example, a hemispherical portion may be adopted.

Additionally, a coil spring may be used as the spring 28c, but is not necessarily limited thereto.

The spring 28c may be fitted to the bullet rod to surround the bullet rod 28b, and one end portion of the spring may be supported by an external surface of the shift lever 22 inside the support bar 28, while the other end portion thereof may be supported by a bottom surface of the cone-shaped portion. As a result, an end portion of the bullet rod, e.g., the cone-shaped portion, may protrude out of the exposed hole of the support bar by elastic force of the spring.

The support bar 28 configured in the present manner may be located in the connection channel 27c defined within the expansion portion 27 of the module body 21. An end portion of one side of the support bar 28 may be fixed to the external surface of the shift lever 22 and may be thus located in the mounting groove 27a, an end portion of the other side may be located in the connection channel, and an end portion of the bullet rod 28b protruding from the support bar may reach the through-hole 27b formed in the expansion portion.

Additionally, the support bar 28 may be spaced from an internal surface of the connection channel 27c by a predetermined gap, and may move in the connection channel. Since the end portion of the one side of the support bar may be fixed to an external surface of the shift lever 22, when the shift lever rotates in the mounting groove 27a around the hinge pin 29, the support bar may rotate in the connection channel in the same direction as the shift lever.

The support block 23 may be inserted into and fixed on the through-hole 27b formed in the expansion portion 27 of the module body 21. The support block may be disposed to be in contact with the end portion of the bullet rod 28b, e.g., the corn-shaped portion, and is configured to support rotation of the support bar 28.

To the present end, a guide groove 23a into which the end portion of the bullet rod 28b is inserted and moveable may be formed on one side surface of the support block 23, to support and guide rotation of the support bar 28. For example, the guide groove may include an approximately V-shaped cross-sectional shape inclined upwards from a center portion of a bottom surface toward both end portions so that the shift lever 22 may easily and automatically return to an initial position thereof. For example, a depth of the guide groove may be deepest in a center portion in a longitudinal direction and may gradually decrease toward both end portions.

When the shift lever 22 rotates in one direction by a hand of the driver, the end portion of the bullet rod 28b on the support bar 28 may move to either end portion of the guide groove 23a. In the instant case, the bullet rod that contacts with the bottom surface of the guide groove and moves along the bottom surface may overcome elastic force of the spring 28c and move inside the support bar, as the depth of the guide groove decreases.

Afterwards, when the driver releases his or her hand from the shift lever 22, the bullet rod 28b may move outside the support bar 28 by the elastic force of the spring 28c, and the end portion of the bullet rod may move to the center portion of the guide groove 23a along the bottom surface.

In the present manner, the bottom surface of the guide groove 23a may act as a kind of cam surface that operates the bullet rod 28b and the spring 28c. As a result, the shift lever 22 may easily and automatically return to the initial position thereof when the driver removes an operating force after controlling shift of a gear stage.

Furthermore, a second permanent magnet 54 may be fixed on the other side of the one end portion of the shift lever 22. Correspondingly, a second sensor 53 including a Hall sensor may be disposed on the opposite side of the connection channel 27c in the mounting groove 27a defined in the expansion portion 27 of the module body 21. The Hall sensor may detect rotation of the shift lever and rotation of the support bar 28 through a change in magnetic flux of the second permanent magnet due to the rotation of the shift lever.

A flexible wire 56 may be connected to the second sensor 53. The wire may be inserted into the wiring passage 26 of the module body 21, and may be physically and electrically connected to the PCB 50 through the wiring passage. However, it is not necessarily limited to a wire, and the second sensor may be electrically connected to the PCB through wireless communications, for example.

Figure 5:
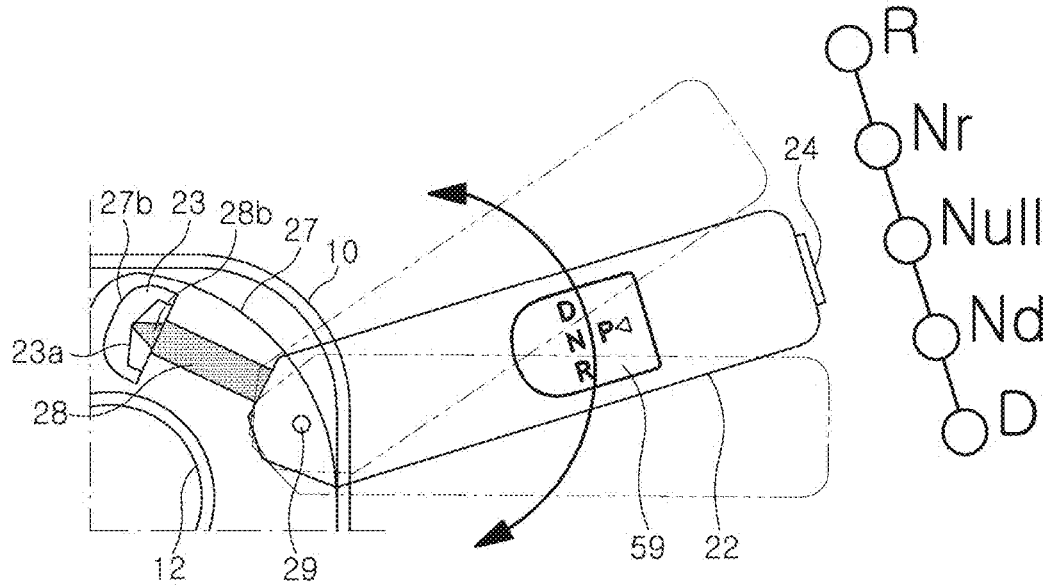
FIG. 5 is a view exemplarily illustrating shift control by a shift lever of a column module in a use mode.

FIG. 5 is a view exemplarily illustrating shift control by a shift lever of a column module in a use mode. In a use mode, for example, when a driver rotates a shift lever 22 in one direction (e.g., clockwise), a D stage may be executed, and when the driver rotates the shift lever 22 in a reverse direction (e.g., counterclockwise), an R stage may be executed. Arrangement of a gear stage is not necessarily limited thereto, and for example, the D stage and the R stage may be arranged oppositely, or a different stage may be placed.

Furthermore, when the driver rotates the shift lever 22 in one direction and removes an operating force, a bullet rod 28b may move along a guide groove 23a of a support block 23 due to elastic force of a spring 28c. The shift lever 22 may automatically return to an initial position thereof.

In the shift lever 22, an intermediate position between the D and R stages may be the initial position (Null stage) that does not generate a specific shift signal, and the shift lever may self-return to the initial position after shifting to the D or R stage. Additionally, an Nd stage may be located between the Null and D stages, and an Nr stage may be located between the Null and R stages. Both the Nr stage and the Nd stage may be an N stage.

Furthermore, a P-stage button 24 may be separately provided in the other end portion of the shift lever 22 so that a vehicle may be parked by operating the P-stage button by the driver.

Optionally, the shift lever 22 may further include an indicator 59 disposed approximately in a center portion in a longitudinal direction thereof. For example, when a column module 20 is disposed in the use mode, the indicator may display the gear stage of the vehicle, and when the column module 20 may be located in a standby mode, the indicator may display visual information images other than the gear stage.

In the instant case, the visual information images other than the gear stage may include one or more of a welcome image, a good-bye image, an autonomous driving activation image, and a driving assistance device activation image.

In the present manner, the indicator 59 may display a current state of the vehicle in various conditions as the visual information images to notify the driver, improving marketability of the vehicle, together with the shift control apparatus.

Optionally, the column module 20 may further include a transmission control unit controlling a driving device of a transmission according to an operation of the shift lever 22. The transmission control unit may be provided on the shift lever, or on a printed circuit board (PCB) 50 in a housing 10.

Depending on a signal received from the PCB 50, the transmission control unit may be configured to display the visual information images other than the gear stage on the indicator 59 in the standby mode, and may be configured to display the gear stage of the vehicle on the indicator in the use mode.

Referring again to FIG. 2 and FIG. 3, the driving unit 30 may include a motor 31 fixed in the housing 10 via the support member 14, a gear unit 32 transmitting driving force of the motor to the column module 20, and a shaft 33 rotating and supporting at least a portion of the gear unit.

The motor 31 may be, for example, a servo motor, a step motor, or the like, configured for rotating in forward and reverse directions. Driving of the motor may be controlled by the PCB 50 including a controller. Therefore, the column module 20 may rotate clockwise or counterclockwise.

The support member 14 may be fixed in the housing 10, and the motor 31 may be fixed on one side of the support member. A support hole 18 may be formed in an end portion of the one side of the support member to support the gear unit 32 and the shaft 33.

Figure 6:
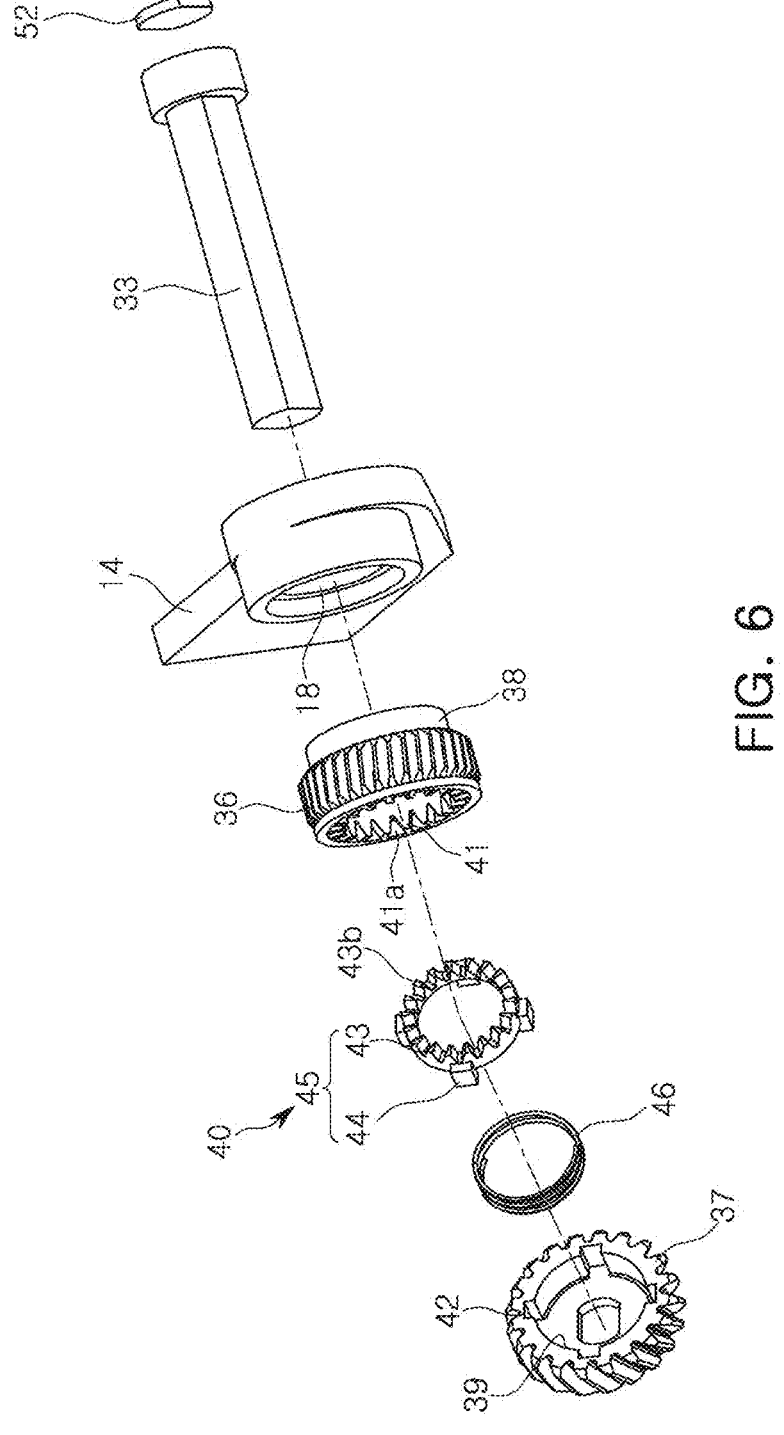
FIG. 6 is an exploded perspective view exemplarily illustrating a gear unit and an override unit of the shift control apparatus according to an exemplary embodiment of the present disclosure, illustrated in FIG. 3.
Figure 7:
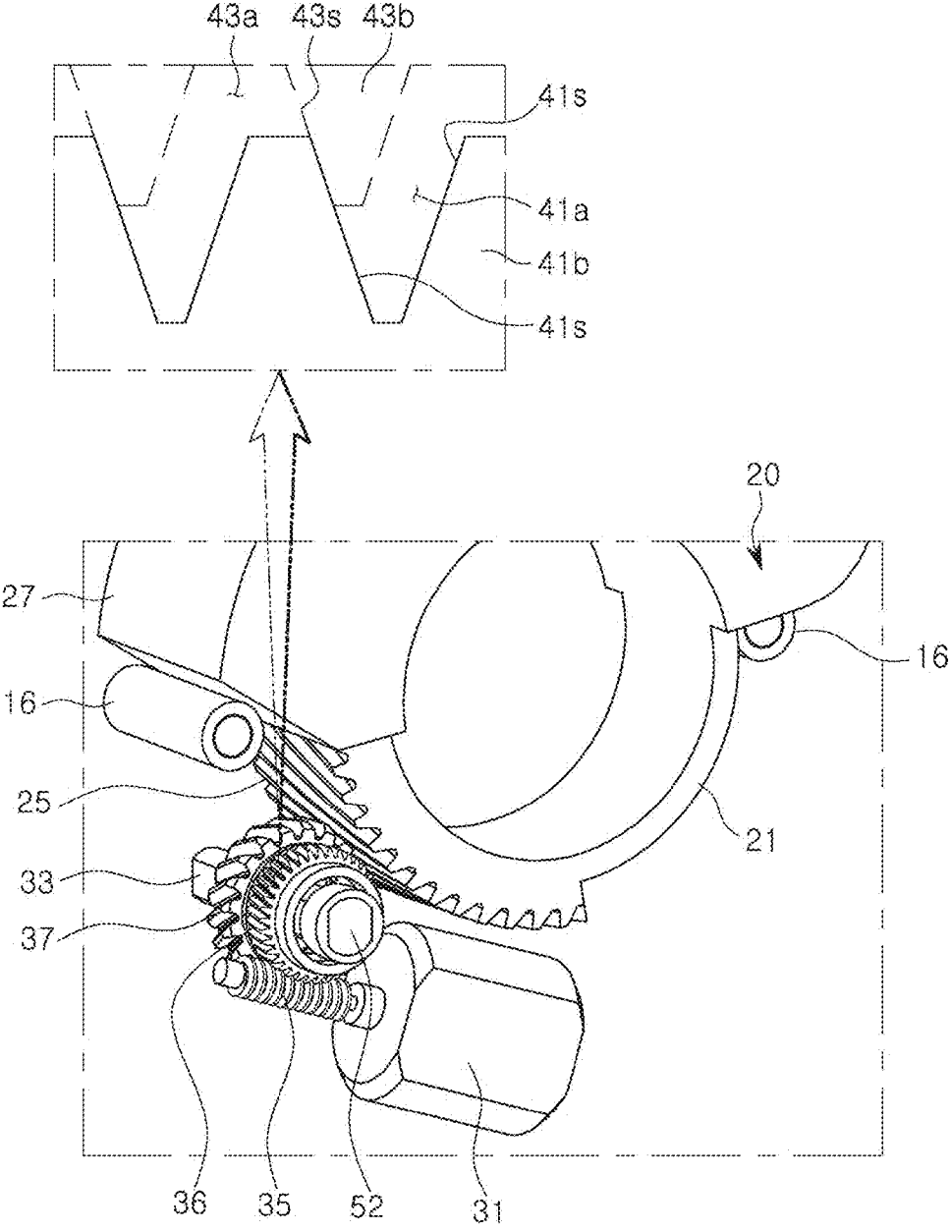
FIG. 7 is a partially enlarged perspective view exemplarily illustrating a driving unit of a shift control apparatus according to an exemplary embodiment of the present disclosure.

FIG. 6 is an exploded perspective view exemplarily illustrating a gear unit and an override unit of the shift control apparatus according to an exemplary embodiment of the present disclosure, illustrated in FIG. 3, and FIG. 7 is a partially enlarged perspective view exemplarily illustrating a driving unit of a shift control apparatus according to an exemplary embodiment of the present disclosure.

The gear unit 32 may include a worm 35 mounted on a motor axis of the motor 31, a worm wheel 36 including an annular shape and engaged with the worm, an intermediate gear 37 mounted on the shaft 33 and arranged coaxially with the worm wheel, and an override unit 40 connecting the worm wheel and the intermediate gear.

The worm wheel 36 may be rotatably supported in the support hole 18 of the support member 14 by a stepped portion 38 formed on one edge portion of an internal surface, and the shaft 33 passes through the annular worm wheel, but may be disposed to relatively rotate without being fixed to the worm wheel.

The intermediate gear 37 may be fixedly mounted on the shaft 33, and a spur gear or a helical gear may be employed as the intermediate gear. The intermediate gear may be engaged with the sector gear 25 formed on the module body 21 of the column module 20. FIGS. 3 and 6 illustrate an intermediate gear, which may be a helical gear, and a sector gear, which may be formed in a spiral shape corresponding thereto, but is not necessarily limited thereto.

Furthermore, an accommodation groove 39 concavely formed in an axial direction (i.e., thickness direction) of the intermediate gear may be provided on one side surface of the intermediate gear 37, and may accommodate the override unit 40.

One end portion of the shaft 33 may be supported by the support hole 18 of the support member 14, and the other end portion thereof may be supported by the support hole 17 formed in the cover 11 of the housing 10. The shaft may pass through the worm wheel 36, the intermediate gear 37, and the override unit 40, and may be fixed to the intermediate gear to rotate together with the intermediate gear.

Therefore, driving force of the motor 31 may be transmitted to the worm 35, the worm wheel 36, the override unit 40, the intermediate gear 37, and the sector gear 25 of the module body 21, to achieve rotation of the column module 20.

A first permanent magnet 52 may be fixed on one side of an end portion of the shaft 33. The first sensor 51 of the PCB 50 in the housing 10 may include a Hall sensor, and the Hall sensor may detect rotation of the column module 20 through a change in magnetic flux of the first permanent magnet due to the rotation of the gear unit 32 and the shaft 33.

A self-locking function may be achieved by the gear unit 32 employing the worm 35 and the worm wheel 36. Due to the self-locking, when driving of the motor 31 stops, the worm may stop without rotating even when external force is transmitted to the worm wheel. As a result, the position of the column module 20 may be fixed in the standby mode or the use mode.

In a shift control apparatus according to an exemplary embodiment of the present disclosure, when the column module 20 cannot rotate using the driving force of the motor due to a failure of the motor 31, the PCB 50, or the like, the driver may forcibly manually rotate the column module. This may be called an override function.

The override unit 40 provided for the present function, in addition to the override function, may act as a medium connecting the worm wheel 36 and the intermediate gear 37, when the column module 20 rotate by the driving force of the motor 31, to transmit the driving force of the motor to the column module, and conversely, when external force is applied to the intermediate gear through the column module, may act as absorbing the predetermined amount of external force not to be transmitted to the motor.

The override unit 40 may include a first override gear unit 41 formed on an edge portion of the other side of an internal surface of the worm wheel 36, a plurality of spline groove portions 42 formed on an internal surface of a side wall in the accommodation groove 39 of the intermediate gear 37, an override ring member 45 including a second override gear unit 43 formed on one side and a plurality of spline protrusions 44 formed on the other side, and an elastic member 46 located between the accommodation groove of the intermediate gear and the override ring member.

The first override gear unit 41 may include a plurality of first groove portions 41a spaced from each other on the other end portion of the worm wheel 36 at predetermined intervals in a circumferential direction and concavely formed in an axial direction (i.e., thickness direction) of the worm wheel. Because a first protrusion 41b may be located between a pair of adjacent first groove portions, the plurality of first groove portions and a plurality of first protrusions may be alternately and continuously arranged in the first override gear unit.

Optionally, the first override gear unit 41 may be formed to be engraved so that the plurality of first protrusions 41b do not protrude in an axial direction from the edge portion of the worm wheel, but the present disclosure is not limited thereto.

The second override gear unit 43 located on one side of the override ring member 45 may include a plurality of second protrusions 43b spaced from each other at regular intervals in a circumferential direction on one side of the override ring member to correspond to the first override gear unit 41 and formed convexly in the axial direction (i.e., thickness direction) of the override ring member 45. Since a second groove portion 43a may be located between a pair of adjacent second protrusions, the plurality of second protrusions and a plurality of second groove portions may be alternately and continuously arranged in the second override gear unit.

Since the override ring member 45 may be pushed toward the worm wheel 36 by elastic force of the elastic member 46, the plurality of second protrusions 43b of the second override gear unit 43 may be respectively fitted into and engaged with the plurality of first groove portions 41a of the first override gear unit 41 so that the worm wheel and the override ring member may be in a connection state configured for transmitting power to each other.

The plurality of spline groove portions 42 may be spaced apart at predetermined intervals in a circumferential direction of the internal surface of the side wall in the accommodation groove 39 of the intermediate gear 37, and may be formed concave in a radial direction thereof. The plurality of spline protrusions 44 located on the other side of the override ring member 45 may be formed to protrude in an axial direction from the edge portion of the other side of the override ring member and to protrude in a radial direction from an external peripheral surface. A plurality of spline groove portions and a plurality of spline protrusions may be formed in the same number.

Even though the elastic member 46 is located between the override ring member 45 and the intermediate gear 37, the plurality of spline protrusions 44 may be at least partially inserted into the plurality of spline groove portions 42, respectively, to couple the override ring member and the intermediate gear, and thereby the override ring member and the intermediate gear may rotate integrally.

The override ring member 45 may relatively move in the longitudinal direction of the shaft 33 with respect to the worm wheel 36 and/or the intermediate gear 37. After being moved, the override ring member may be pushed toward the worm wheel by the elastic force of the elastic member 46, as described above. In the instant case, a coil spring may be employed as the elastic member, but the present disclosure is not necessarily limited thereto.

A shift control apparatus according to an exemplary embodiment of the present disclosure may be characterized in that a first inclined surface 41s is provided on both side walls of the first groove portion 41a, and a second inclined surface 43s, corresponding to the first inclined surface 41s, is provided on both side surfaces of the second protrusion 43b in a circumferential direction thereof.

As a result, the first groove portion 41a may have a trapezoidal cross-sectional shape in which a distance between both the side walls decreases in a depth direction, and as a result, the first protrusion 41b formed between the pair of first groove portions may also have a trapezoidal cross-sectional shape.

Likewise, the second protrusion 43b corresponding to the first groove portion 41a may have the same cross-sectional shape as the first groove portion, and as a result, the second groove portion 43a formed between the pair of second protrusions may also have a trapezoidal cross-sectional shape.

When the second protrusion 43b is inserted into the first groove portion 41a, the first inclined surface 41s and the second inclined surface 43s may be in contact with each other. In in the instant state, when driving force of the motor 31 is transmitted to the override ring member 45 through the worm 35 and the worm wheel 36, the override ring member may rotate in a first direction (e.g., clockwise) or in a second direction (e.g., counterclockwise), opposite to the first direction, and a rotation force of the override ring member may be transmitted to the intermediate gear 37 due to engagement of the plurality of first groove portions 41a and the plurality of second protrusions 43b.

As the intermediate gear 37 rotates, the column module 20 may rotate, together with the sector gear 25 of the module body 21 engaged therewith. In the instant case, the shaft 33 fixed to the intermediate gear may also rotate so that the Hall sensor forming the first sensor 51 of the PCB 50 in the housing 10 may detect rotation of the column module by a change in magnetic flux of the first permanent magnet 52 by rotation of the shaft.

In a state in which the second protrusion 43*b* is inserted into the first groove portion 41*a* and the first inclined surface 41*s* and the second inclined surface 43*s* are in contact with each other, when the sector gear 25 of the module body 21 rotates, together with the column module 20, by a predetermined amount of external force, the intermediate gear 37 engaged with the sector gear may rotate in the first or second direction, but the worm wheel 36 and the worm 35 may not rotate due to self-locking.

Therefore, the second inclined surface 43*s* on either side of the second protrusion 43*b* may move along the first inclined surface 41*s*, in contact, in the first groove portion 41*a*, and thereby the override ring member 45 may overcome the elastic force of the elastic member 46 to move toward the intermediate gear 37 in the longitudinal direction of the shaft 33.

After the second protrusion 43*b* comes out of the first groove portion 41*a*, the override ring member 45 may rotate in the rotation direction of the intermediate gear 37, and therefore, the second protrusion may move in the circumferential direction, and may be inserted into a different first groove portion adjacent to the first groove portion by the elastic force of the elastic member 46.

Such a series of processes may be repeated until the predetermined amount of external force is sufficiently absorbed, and thereby, the intermediate gear 37 may rotate relative to the worm wheel 36 when the predetermined amount of external force is applied. As a result, a shift control apparatus according to an exemplary embodiment of the present disclosure may implement an override function.

Figures 8A, 8B:
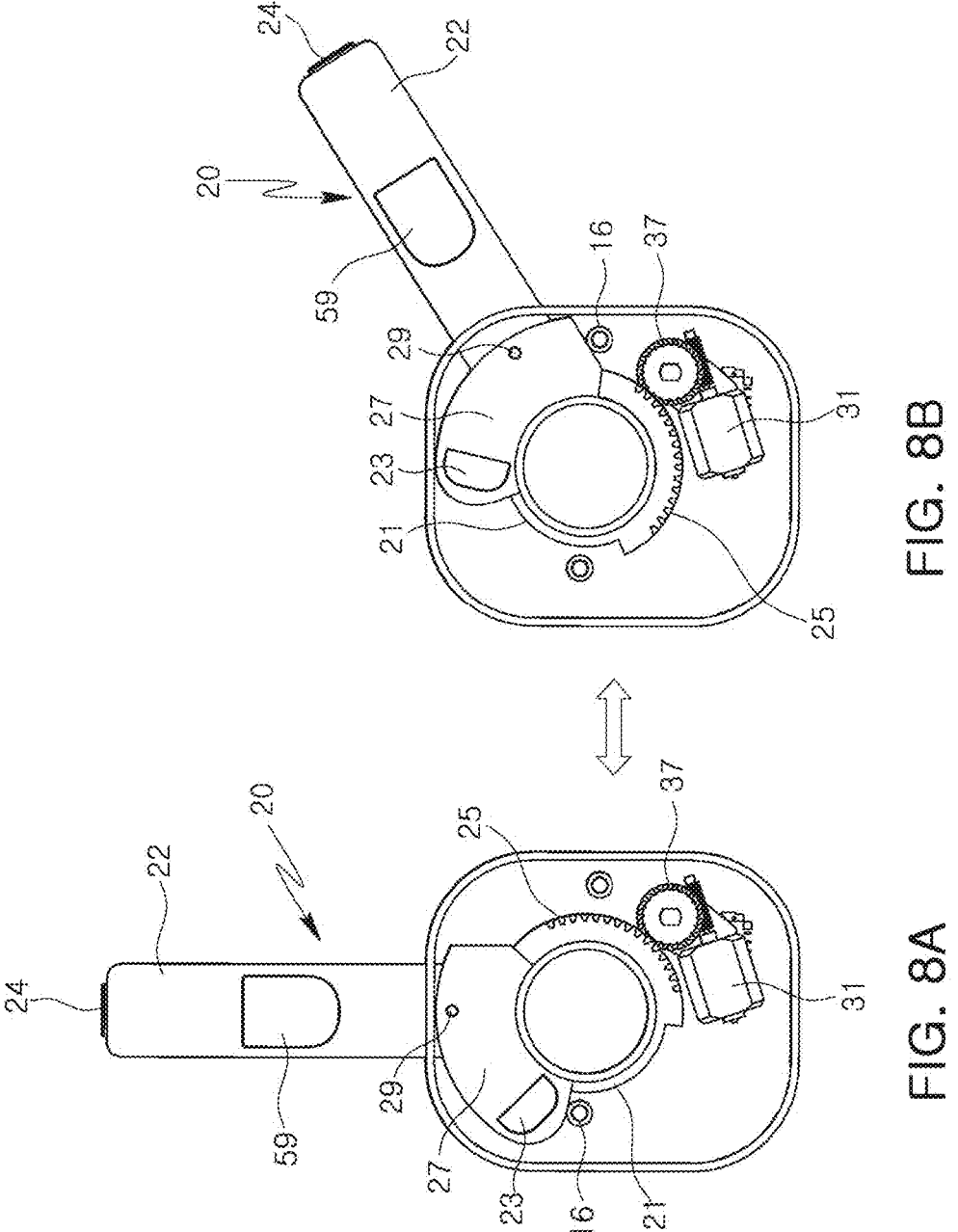
FIG. 8A and FIG. 8B are views illustrating a state in which a column module is in a standby mode and a use mode by operation of a shift control apparatus according to an exemplary embodiment of the present disclosure.

FIG. 8A and FIG. 8B are views exemplarily illustrating a state in which a column module is in a standby mode and a use mode by operation of a shift control apparatus according to an exemplary embodiment of the present disclosure.

A column module 20 may rotate around a steering column 2 when a driving unit 30 operates, and a position thereof may be changed between a standby mode and a use mode depending on rotation. In FIG. 8A illustrates the column module in the standby mode, and FIG. 8B illustrates the column module in the use mode.

For example, the standby mode may be defined as a position in which the column module 20 extends upwardly in a front of a steering wheel 1, based on a perspective of a driver, and the use mode may be defined as a position in which the column module rotates from the standby mode and is disposed to extend laterally.

For example, the standby mode may be in a position in which the column module 20 extends in a 12 o'clock direction, and the use mode may be in a position in which the column module 20 extends in an approximately 2 o'clock or 10 o'clock direction thereof.

A change in position between the standby mode and the use mode of the column module 20 may be implemented by operating the driving unit 30, and a change in position from the standby mode to the use mode is desirable to set the same at 90 degrees or lower to prevent the column module from interfering with the driver's knee.

The column module 20 may rotate in one direction (e.g., clockwise) from the standby mode to change a position thereof to the use mode, by operating the driving unit 30, and may return from the use mode to the standby mode by rotating in a reverse direction thereof.

In the present manner, the column module 20 may be located to extend upward in the standby mode so that when the driver gets on the vehicle, the column module may be located at the front which the driver's gaze is directed, to easily transmit visual information images other than the gear stage indicated by an indicator 59 to the driver, generating a sense of aesthetics.

Additionally, in the use mode, the column module 20 may be located to extend laterally so that the driver may easily change the gear stage by easily holding a shift lever 22 provided on the column module.

When a printed circuit board (PCB) 50 forming a controller of the shift control apparatus receives a signal from an input unit 60, it may control to drive a motor 31 of the driving unit 30 to change a position of the column module 20. In the instant case, the input unit may include a high rank control system and a different controller of the vehicle, various sensors of the vehicle, or the like.

The signal of the input unit 60 may be any one of a start-on signal and a start-off signal of the vehicle, an open signal and a close signal of a door, a lock signal and an unlock signal of the door, an entry signal of an autonomous driving mode, or a change signal of a driver mode.

For example, the column module 20 may be located in the standby mode when the vehicle is started off, and may be located in the use mode when the vehicle is started on. by changing a position of the column unit, the driver may clearly recognize whether the vehicle is starting or not.

In the instant case, starting may include not only a driving state of an internal combustion engine, but also the driving preparation (e.g., 'READY') state of the electric vehicle.

When a start-on signal is received, a welcome image may be displayed on the indicator 59 of the column module 20. This may allow the driver to clearly recognize whether the vehicle is starting or not. In the electric vehicle, effectively informing the driver that the vehicle has started may be improved.

Additionally, the column module 20 may be located in the standby mode when an open signal of the door is received, and may be located in the use mode when a close signal of the door is received. Additionally, the column module may be located in the standby mode when a unlock signal of the door is received, and may be located in the use mode when a lock signal of the door is received.

Even in the open signal or the unlock signal of the door, a welcome image may be displayed on the indicator 59 of the column module 20, providing aesthetic satisfaction to the driver.

Additionally, the column module 20 may be located in the standby mode in the autonomous driving mode, and may be located in the use mode in the driver mode. In the autonomous driving mode, the vehicle may be in a driving state, but the column module may be in the standby mode, and in the instant case, an autonomous driving activation image may be displayed on the indicator 59 to improve awareness of entering the autonomous driving mode.

As illustrated in FIG. 8A, when the column module 20 is located in the standby mode, the vehicle may be in a start-off state or may be in an autonomous driving state. Therefore, in the instant case, even when the driver operates the shift lever 22 of the column module, it is impossible to change the gear stage for safety reasons.

Exceptionally, when the shift lever 22 or a P-stage button 24 of the column module 20 may be operated for a certain time period immediately after the vehicle is started off for parking, a shift signal to an N stage or a P stage may be transmitted.

As illustrated in FIG. 8B, when the column module 20 is located in the use mode, the driver may change the gear stage by operation of rotating the shift lever 22.

For example, when the driver operates the shift lever 22, a second sensor 53 may detect a change in the gear stage, and may transmit detected information to a transmission control unit through the PCB 50, and the transmission control unit may transmit the information to the high rank control system of the vehicle, to perform shifting. When the shift is completed, the high rank control system of the vehicle may transmit a shift completion signal to the transmission control unit, and finally, the indicator 59 may display changed information on the gear stage by the transmission control unit.

In the present manner, a shift control apparatus according to an exemplary embodiment of the present disclosure may allow the driver to easily recognize a current state of the vehicle under various conditions by changing a position between the standby mode and the use mode, and may display a visual information image on the indicator 59 to notify the driver, to provide a high-tech image. Therefore, there may be an advantage of improving marketability of the vehicle along with the shift control apparatus.

Moreover, in a shift control apparatus according to an exemplary embodiment of the present disclosure, when the column module 20 cannot rotate using the driving force of the motor due to a failure of the motor 31, the PCB 50, or the like, e.g., the driving unit cannot automatically rotate the column module from the standby mode to the use mode, the driver may forcibly manually rotate from the standby mode to the use mode. Therefore, there may be an effect of further strengthening reliability of the shift control apparatus.

Figure 9:
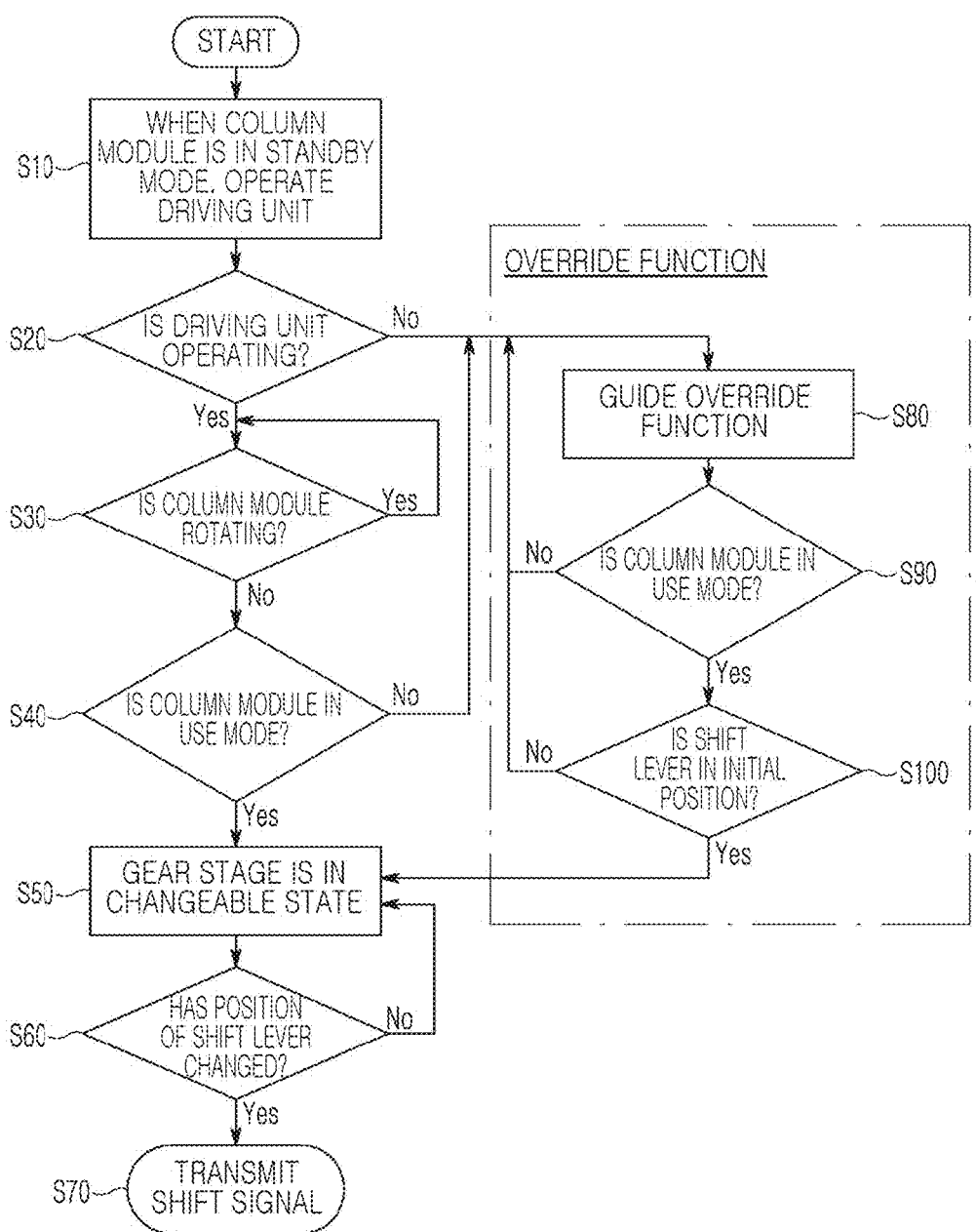
FIG. 9 is a flowchart illustrating a method for controlling a shift control apparatus according to an exemplary embodiment of the present disclosure.
Figures 10A, 10B, 10C:
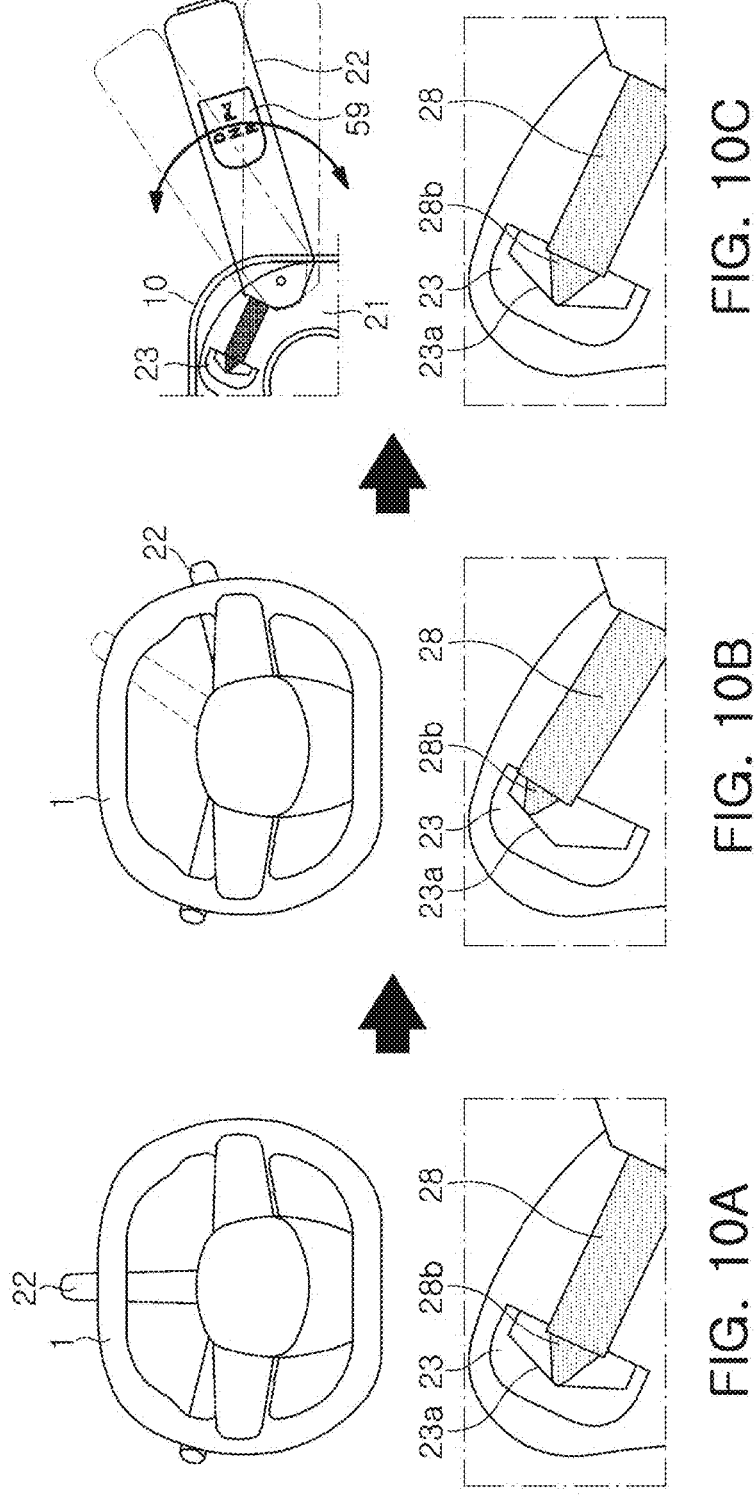
FIG. 10A, FIG. 10B and FIG. 10C are views illustrating a process for limiting transmission of a shift signal in a method for controlling a shift control apparatus according to an exemplary embodiment of the present disclosure.

FIG. 9 is a flowchart illustrating a method for controlling a shift control apparatus according to an exemplary embodiment of the present disclosure, and FIG. 10A, FIG. 10B and FIG. 10C are views exemplarily illustrating a process for limiting transmission of a shift signal in a method for controlling a shift control apparatus according to an exemplary embodiment of the present disclosure.

In various exemplary embodiments of the present disclosure, a controller of the PCB 50 may perform the operation of the flowchart shown in FIG. 9

In a shift control apparatus according to an exemplary embodiment of the present disclosure, configured as described above, unintentional shifting may occur because a rotational trajectory of a column module 20 coincides with a rotational trajectory of a shift lever 22.

For example, in the event of a failure in which the column module 20 cannot rotate using driving force of a motor 31, a driver may manually execute an override function to force the column module to rotate from a standby mode to a use mode. In the instant case, since a direction in which the column module is forcibly operated coincides with a direction of shifting to a D stage, there may be a risk that unintentional shifting to the D stage occurs.

To prevent this, a method for controlling a shift control apparatus according to an exemplary embodiment of the present disclosure may be characterized in that the shift control apparatus is limited to transmitting a shift signal, especially a shift signal to the D stage, only when certain conditions are satisfied.

To the present end, a printed circuit board (PCB) 50, which forms a controller of the shift control apparatus, may distinguish between an operation of rotating the column module 20 including the shift lever 22 by the driver for the override function, and an operation of rotating the shift lever by the driver for shifting, and may restrict transmission of a shift signal by the shift control apparatus so that no shift occurs in the operation of rotating the column module including the shift lever for the override function.

A method for controlling a shift control apparatus according to an exemplary embodiment of the present disclosure may include, when a column module 20 is in a standby mode, operating a driving unit 30 (S10) and determining whether the driving unit is operating (S20); when the driving unit operates, determining whether the column module is rotating (S30); when the column module does not rotate, determining whether the column module is in a use mode (S40); when the column module is in the use mode, determining that a gear stage is in a changeable state (S50); determining whether a position of the shift lever has changed (S60); and when the position of the shift lever changes, transmitting a shift signal according to the position of the shift lever (S70).

For example, a column module 20 may be located in a standby mode when a vehicle is in a start-off state, and may be located in a use mode when the vehicle is in a start-on state. The standby mode may be defined as a position in which the column module extends upwardly in front of a steering wheel 1, based on a perspective of a driver, and the use mode may be defined as a position in which the column module rotates from the standby mode and is disposed to extend laterally.

When a start-on signal of the vehicle is received from an input unit 60, a printed circuit board (PCB) 50 may be configured for controlling a motor 31 of a driving unit 30 to operate (S10), to change a position of the column module 20. Therefore, the column module may rotate in one direction (e.g., clockwise) in the standby mode, to change the position to the use mode.

A first permanent magnet 52 may be fixed on one side of an end portion of a shaft 33 forming the driving unit 30, and a Hall sensor forming a first sensor 51 of the PCB 50 in a housing 10 may detect rotation of the column module 20 through a change in magnetic flux of the first permanent magnet due to rotation of a gear unit 32 and rotation of the shaft 33. Therefore, the PCB may be configured to determine whether the driving is operating, e.g., whether the driving unit is malfunctioning (S20).

When the driving unit 30 operates, since the column module 20 may rotate, the PCB 50 may continue to monitor rotation of the column module using the first permanent magnet 52 and the Hall sensor of the first sensor 51. Therefore, the PCB may be configured to determine whether the column module is rotating (S30).

Subsequently, when an operation of the driving unit 30 and the rotation of the column module 20 stop, the PCB 50 may compare a change in magnetic flux of the first permanent magnet 52 measured by the Hall sensor of the first sensor 51 and a change in magnetic flux of the first permanent magnet expected to be obtained when the column module is located in the use mode, to determine whether the column module is located in the use mode (S40).

When a level of the measured change in magnetic flux of the first permanent magnet matches a level of the expected change in magnetic flux of the first permanent magnet, the PCB 50 may be configured to determine that the column module 20 is in the use mode, and may be configured to determine that a gear stage of the shift control apparatus is in a changeable state (S50).

In such a use mode, for example, when the driver rotates a shift lever 22 in one direction (e.g., clockwise), a D stage may be executed, and when the driver rotates the shift lever 22 in a reverse direction (e.g., counterclockwise), an R stage may be executed.

Furthermore, when the driver rotates the shift lever 22 in one direction and then removes an operating force, a bullet rod 28b mounted on a support bar 28 of the shift lever may move along a guide groove 23a of a support block 23 due to elastic force of a spring 28c, and the shift lever may automatically return to an initial position thereof.

A second permanent magnet 54 may be fixed in one end portion of the shift lever 22, and a Hall sensor forming a second sensor 53 in a mounting groove 27a defined in an expansion portion 27 of a module body 21 may detect rotation of the shift lever and rotation of the support bar 28 through a change in magnetic flux of the second permanent magnet due to the rotation of the shift lever.

Because the second sensor 53 is connected to the PCB 50 through a wire 56, the PCB may use the second permanent magnet 54 and the Hall sensor of the second sensor to determine whether a position of the shift lever 22 has changed (S60).

When it is confirmed that the position of the shift lever 22 has changed, the PCB 50 may transmit a shift signal according to the position of the shift lever to a transmission control unit or a high rank control system of the vehicle (S70).

Afterwards, when shift of a transmission is completed, the high rank control system of the vehicle may transmit a shift completion signal to the transmission control unit, and finally, an indicator 59 may display changed information related to the gear stage by the transmission control unit.

A method for controlling a shift control apparatus according to an exemplary embodiment of the present disclosure may include, when the driving unit 30 is not operating or when the column module 20 stops and is not in the use mode, guiding an override function to the driver (S80).

In detecting using the first sensor 51 (e.g., the first permanent magnet and the Hall sensor), when it is determined that the driving unit 30 does not operate (see S20) or the rotation of the column module 20 stops but the column module is not in the use mode (see S40), the PCB 50 may transmit corresponding information to the high rank control system of the vehicle and/or transmission control unit.

For example, the high rank control system of the vehicle may guide the driver to execute the override function visually through a monitor and/or audibly through a speaker, provided inside the vehicle (S80).

Alternatively, the transmission control unit may display a visual information image through the indicator 59 to guide the driver to execute the override function (S80).

As illustrated in FIG. 10A, in case of a rotation failure in which the column module 20 cannot rotate using the driving force of the motor 31 due to a malfunction, the driver may be instructed to execute the override function, and the driver may manually forcibly rotate the column module. In the instant case, the rotation failure may occur at a start time of driving of the motor or while driving.

As illustrated in FIG. 10B, in the rotation failure, when a sector gear 25 of the module body 21, together with the column module 20, rotates in a first direction (e.g., clockwise from a perspective of the driver) due to external force applied by the driver, an intermediate gear 37 engaged with the sector gear may rotate in the second direction, but a worm wheel 36 may not rotate due to self-locking.

Therefore, a second inclined surface 43s on either side of a second protrusion 43b may move along a first inclined surface 41s, in contact, in a first groove portion 41a, and thereby an override ring member 45 may overcome elastic force of an elastic member 46 to move toward the intermediate gear 37 in a longitudinal direction of the shaft 33.

After the second protrusion 43b comes out of the first groove portion 41a, the override ring member 45 may rotate in a rotation direction of the intermediate gear 37, e.g., in a second direction, and therefore, the second protrusion may move in a circumferential direction, and may be inserted into a different first groove portion adjacent to the first groove portion by the elastic force of the elastic member 46.

Such a series of processes may be repeated until the predetermined amount of external force is sufficiently absorbed, and thereby, the intermediate gear 37 may rotate relative to the worm wheel 36 when the predetermined amount of external force is applied.

When the driver rotates the column module 20 to a position in the use mode, further rotation of the column module may be prevented by an one-side stopper 16 provided on a cover 11 of the housing 10, and whether the column module has normally reached the position in the use mode by override may be confirmed by detecting by the first sensor 51.

During the present process, the shift lever 22 may be in a D stage (or R stage) position due to external force applied by the driver, but since no shift signal may be transmitted, an actual gear stage of the vehicle may be maintained in an N stage or a P stage. As a result, unintentional shifting to the D stage may be prevented.

A method for controlling a shift control apparatus according to an exemplary embodiment of the present disclosure may further include, after the guiding the driver to use an override function, determining whether the column module 20 is in the use mode (S90); and determining whether the shift lever 22 has returned to an initial position thereof, e.g., to Null (S100).

In a state in which the operation of the driving unit 30 and the rotation of the column module 20 stop, the PCB 50 may be configured to determine that the column module 20 is in the use mode by comparing a change in magnetic flux of the first permanent magnet 52 measured by the Hall sensor of the first sensor 51 after being rotated with the shaft 33 by the driver and a change in magnetic flux of the first permanent magnet expected to be obtained when the column module is located in the use mode (S90).

Moreover, after the override function of the shift control apparatus is completed, the PCB 50 may be configured to determine whether the shift lever has returned to an initial position thereof (e.g., Null) by comparing a change in magnetic flux of the second permanent magnet 54 measured by the Hall sensor of the second sensor 53 and a change in magnetic flux of the second permanent magnet expected to be obtained when the shift lever 22 is in the initial position, as illustrated in FIG. 10C (S100).

As a result, the PCB 50 may at least check whether external force, e.g., an operation force by the driver, is applied to the shift lever 22, and then confirm that the shift lever is prepared to generate a specific shift signal corresponding to the D stage or the R stage.

When a change in magnetic flux of the permanent magnets 52 and 54 measured by each Hall sensor matches a predetermined level, the PCB 50 may be configured to determine that the column module 20 is in the use mode and the shift lever 22 is returned to the initial position, and accordingly, it may be determined that the gear stage of the shift control apparatus is changeable (S50).

As described above, determining whether a position of the shift lever 22 has changed (S60); and when the position of the shift lever changes, transmitting a shift signal according to the position of the shift lever (S70) may be performed.

Accordingly, in a method for controlling a shift control apparatus according to an exemplary embodiment of the present disclosure, the shift control apparatus may be controlled to transmit a shift signal, only when specific conditions, e.g., conditions in which the column module 20 is located in the use mode and the shift lever 22 is returned to the initial position at the same time, are satisfied.

As described above, according to an exemplary embodiment of the present disclosure, the driver may manually rotate the column module so that the column module may rotate from the standby mode to the use mode even when a malfunction occurs. Therefore, there may be an effect of further strengthening reliability of the shift control apparatus.

Furthermore, the term related to a control device such as "controller", "control apparatus", "control unit", "control device", "control module", "control circuit", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured for processing data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

Hereinafter, the fact that pieces of hardware are coupled operably may include the fact that a direct and/or indirect connection between the pieces of hardware is established by wired and/or wirelessly.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A shift control apparatus comprising:
a housing;
a column module including a module body rotatably coupled to the housing, and a shift lever rotatably hinged relative to the module body and protruding from the housing; and
a driving unit disposed in the housing and engaged to the module body to rotate the module body,
wherein the housing is fixed on a steering column in front of a steering wheel,
wherein the steering column passes through the housing and the module body together, and
wherein the column module rotates around the steering column in response that the driving unit operates, and changes a position thereof to a standby mode or a use mode.

2. The shift control apparatus of claim 1,
wherein a sector gear is formed on a first side of the module body and engages with a gear unit of the driving unit, and
wherein an expansion portion extending in a radial direction and including a hollow portion is formed on a second side of the module body, and one end portion of the shift lever is accommodated in and hinged to the expansion portion.

3. The shift control apparatus of claim 2,
wherein the shift lever includes a support bar extending in a predetermined direction, intersecting a longitudinal axis line of the shift lever, and
wherein the column module further includes a support block provided on the module body to support movement of the support bar.

4. The shift control apparatus of claim 3,
wherein a bullet rod and a spring are mounted in the support bar, and
wherein an end portion of the bullet rod slidably protrudes out of the support bar by elastic force of the spring.

5. The shift control apparatus of claim 4,
wherein a guide groove into which the end portion of the bullet rod is movably inserted is formed on one side surface of the support block, and
wherein a depth of the guide groove is deepest in a center portion in a longitudinal direction and decreases toward an end thereof.

6. The shift control apparatus of claim 2,
wherein a first sensor detecting rotation of the column module is disposed in the housing,
wherein a second sensor detecting rotation of the shift lever is disposed in the expansion portion, and
wherein the first sensor and the second sensor are physically or electrically connected to a printed circuit board mounted in the housing.

7. The shift control apparatus of claim 2, wherein the driving unit includes:
a motor fixed in the housing;
the gear unit transmitting driving force of the motor to the sector gear; and
a shaft rotating and supporting at least a portion of the gear unit, and
wherein a printed circuit board is mounted in the housing to control driving of the motor.

8. The shift control apparatus of claim 7, wherein the gear unit includes:
a worm mounted on a motor axis of the motor;
a worm wheel engaged with the worm;
an intermediate gear fixedly mounted on the shaft and disposed coaxially with the worm wheel; and
an override unit connecting the worm wheel and the intermediate gear,
wherein the intermediate gear engages with the sector gear, and
wherein the override unit allows the intermediate gear to rotate relative to the worm wheel when external force is applied.

9. The shift control apparatus of claim 8, wherein the override unit includes:
a first override gear unit formed on an end portion of an internal surface of the worm wheel;
a plurality of spline groove portions formed on an internal surface of a side wall in an accommodation groove of the intermediate gear;
an override ring member in which a second override gear unit engaged with the first override gear unit is formed on a first side, and a plurality of spline protrusions at least partially fitted into each of the spline groove portions are formed on a second side; and
an elastic member located between the accommodation groove and the override ring member.

10. The shift control apparatus of claim 9, wherein the first override gear unit includes a plurality of first groove portions, wherein first and second side walls of each of the first groove portions include a first inclined surface,
the second override gear unit includes a plurality of second protrusions to correspond to the first override gear units, wherein first and second side surfaces of each of the second protrusions in a circumferential direction include a second inclined surface, and
in response that external force is applied, the second protrusion is inserted into another adjacent first groove portion over one of first inclined surfaces of the first groove portion, so that the override ring member in the intermediate gear rotates with respect to the worm wheel.

11. The shift control apparatus of claim 1,
wherein the standby mode is a position in which the column module extends from the front of the steering wheel in an upward direction, and
wherein the use mode is a position in which the column module rotates from the standby mode and is located to extend in a lateral direction of the steering wheel.

12. The shift control apparatus of claim 1, wherein a rotational trajectory of the column module coincides with a rotational trajectory of the shift lever.

13. A shift control apparatus comprising:
a housing;
a column module including a module body rotatably coupled to the housing, and a shift lever rotatably hinged relative to the module body and protruding from the housing; and

US 12,630,012 B2

23 a driving unit provided in the housing and engaged to the
module body to rotate the module body,
wherein a sector gear is formed on a first side of the
module body,
wherein the driving unit includes:
    a motor fixed in the housing;
    a gear unit engaging with the sector gear and transmit-
        ting driving force of the motor to the sector gear; and
    a shaft rotating and supporting at least a portion of the
        gear unit,
    wherein the gear unit includes:
    a worm mounted on a motor axis of the motor;
    a worm wheel engaged with the worm;
    an intermediate gear fixedly mounted on the shaft and
        disposed coaxially with the worm wheel; and
    an override unit connecting the worm wheel and the
        intermediate gear,
wherein the intermediate gear engages with the sector
    gear,

24 wherein the override unit allows the intermediate gear to
    rotate relative to the worm wheel when external force
    is applied,
wherein the override unit includes:
    a first override gear unit formed on an end portion of an
        internal surface of the worm wheel;
    a plurality of spline groove portions formed on an
        internal surface of a side wall in an accommodation
        groove of the intermediate gear;
    an override ring member in which a second override
        gear unit engaged with the first override gear unit is
        formed on a first side, and a plurality of spline
        protrusions at least partially fitted into each of the
        spline groove portions are formed on a second side;
        and
    an elastic member located between the accommodation
        groove and the override ring member.

* * * * *